| (12) United States Patent | (10) Patent No.: US 9,774,717 B2 |
| Miller et al. | (45) Date of Patent: Sep. 26, 2017 |

(54) SYSTEM AND METHOD FOR DETECTING THE LOCATION OF A COMMUNICATION DEVICE IN A VEHICLE BASED ON CAMERA DETECTION

(75) Inventors: Thomas Lee Miller, Ann Arbor, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 827 days.

(21) Appl. No.: 13/116,347

(22) Filed: May 26, 2011

(65) Prior Publication Data

US 2011/0298924 A1    Dec. 8, 2011

Related U.S. Application Data

(60) Provisional application No. 61/352,251, filed on Jun. 7, 2010, provisional application No. 61/361,621, filed on Jul. 6, 2010.

(51) Int. Cl.
| H04N 7/18 | (2006.01) |
| H04M 1/60 | (2006.01) |
| B60R 11/02 | (2006.01) |
| H04M 1/67 | (2006.01) |

(Continued)

(52) U.S. Cl.
CPC ....... H04M 1/6075 (2013.01); B60R 11/0241 (2013.01); H04M 1/67 (2013.01); H04M 1/72577 (2013.01); H04W 4/027 (2013.01)

(58) Field of Classification Search
USPC ....................................... 348/148
See application file for complete search history.

(56) References Cited

U.S. PATENT DOCUMENTS

| 6,028,537 A | 2/2000 | Suman et al. |
| 6,278,772 B1 | 8/2001 | Bowater et al. |
| 6,385,535 B2 | 5/2002 | Ohishi et al. |

(Continued)

FOREIGN PATENT DOCUMENTS

| JP | 2007205872 A | 8/2007 |
| JP | 2008172820 A | 7/2008 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Leron Beck
(74) *Attorney, Agent, or Firm* — Brooks Kushman P.C.; Jennifer M. Stec (57) ABSTRACT

A system for detecting a personal communication device (PCD) in a vehicle having driver and passenger zones is provided. The system includes a camera and a controller. The camera is configured to transmit a first signal indicative of a captured image of an object in the driver zone. The controller is configured to receive the first signal and to receive a status signal indicative of the PCD being in a sleep mode or an active mode. The controller is further configured to receive a motion signal indicative of the PCD being in a stationary mode or a motion mode and to detect that the PCD is in the driver zone if the captured image of the object corresponds to the PCD and if the status signal indicates that the PCD is in the wake up mode or the motion signal indicates that the PCD is in the motion mode.

20 Claims, 5 Drawing Sheets

(51) Int. Cl.
 *H04M 1/725* (2006.01)
 *H04W 4/02* (2009.01)

(56) References Cited

U.S. PATENT DOCUMENTS

| | | |
|---|---|---|
| 6,411,899 B2 | 6/2002 | Dussell et al. |
| 6,459,969 B1 | 10/2002 | Bates et al. |
| 6,505,780 B1 | 1/2003 | Yassin et al. |
| 6,600,975 B2 | 7/2003 | Moriguchi et al. |
| 6,690,956 B2 | 2/2004 | Chua et al. |
| 6,993,490 B2 | 1/2006 | Chen et al. |
| 7,120,928 B2 | 10/2006 | Sheth et al. |
| 7,139,722 B2 | 11/2006 | Perrella et al. |
| 7,142,664 B2 | 11/2006 | Seligmann |
| 7,145,998 B1 | 12/2006 | Holder et al. |
| 7,283,813 B2 | 10/2007 | Hamanaga et al. |
| 7,346,630 B2 | 3/2008 | Eichstaedt et al. |
| 7,376,226 B2 | 5/2008 | Holder et al. |
| 7,433,714 B2 | 10/2008 | Howard et al. |
| 7,444,384 B2 | 10/2008 | Horvitz |
| 7,469,827 B2 | 12/2008 | Katragadda et al. |
| 7,471,929 B2 | 12/2008 | Fujioka et al. |
| 7,474,264 B2 | 1/2009 | Bolduc et al. |
| 7,586,956 B1 | 9/2009 | Mishra et al. |
| 7,813,950 B2 | 10/2010 | Perrella et al. |
| 7,889,096 B2 | 2/2011 | Breed |
| 7,957,773 B2 | 6/2011 | Cua et al. |
| 8,131,205 B2 | 3/2012 | Rosen |
| 2002/0107032 A1 | 8/2002 | Agness et al. |
| 2004/0073643 A1 | 4/2004 | Hayes et al. |
| 2004/0135669 A1 | 7/2004 | Muench-Casanova |
| 2004/0192270 A1 | 9/2004 | Kreitzer |
| 2004/0220768 A1 | 11/2004 | Klein |
| 2004/0233070 A1 | 11/2004 | Finnern |
| 2005/0019228 A1 | 1/2005 | Myers et al. |
| 2005/0088284 A1 | 4/2005 | Zai et al. |
| 2006/0058948 A1 | 3/2006 | Blass et al. |
| 2006/0290490 A1 | 12/2006 | Kraus et al. |
| 2007/0042812 A1 | 2/2007 | Basir |
| 2007/0120948 A1 | 5/2007 | Fujioka et al. |
| 2007/0124043 A1 | 5/2007 | Ayoub et al. |
| 2007/0285256 A1 | 12/2007 | Batra |
| 2008/0057927 A1 | 3/2008 | Han |
| 2008/0086455 A1 | 4/2008 | Meisels et al. |
| 2008/0319653 A1 | 12/2008 | Moshfeghi |
| 2008/0319665 A1 | 12/2008 | Berkobin et al. |
| 2009/0005966 A1 | 1/2009 | McGray et al. |
| 2009/0075624 A1 | 3/2009 | Cox et al. |
| 2009/0111422 A1 | 4/2009 | Bremer et al. |
| 2009/0144622 A1 | 6/2009 | Evans et al. |
| 2009/0248285 A1 | 10/2009 | Bauer |
| 2009/0267757 A1 | 10/2009 | Nguyen |
| 2009/0312901 A1 | 12/2009 | Miller et al. |
| 2010/0035632 A1 | 2/2010 | Catten |
| 2010/0062714 A1 | 3/2010 | Ozaki |
| 2010/0136944 A1 | 6/2010 | Taylor et al. |
| 2010/0148920 A1 | 6/2010 | Philmon et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2011/0021234 A1 | 1/2011 | Tibbitts et al. |
| 2011/0039581 A1 | 2/2011 | Cai et al. |
| 2011/0045810 A1 | 2/2011 | Issa et al. |
| 2011/0077032 A1 | 3/2011 | Correale et al. |
| 2011/0105082 A1 | 5/2011 | Haley |
| 2011/0137520 A1 | 6/2011 | Rector et al. |
| 2011/0137773 A1 | 6/2011 | Davis, III et al. |
| 2011/0176670 A1 | 7/2011 | Kaplan et al. |
| 2011/0257973 A1 | 10/2011 | Chutorash et al. |
| 2011/0300843 A1 | 12/2011 | Miller et al. |
| 2011/0300884 A1 | 12/2011 | Ollila et al. |
| 2011/0301780 A1 | 12/2011 | Miller et al. |

FOREIGN PATENT DOCUMENTS

| | | |
|---|---|---|
| WO | 03107129 A2 | 12/2003 |
| WO | 2011016886 A1 | 2/2011 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

jNetX Call Reminder for BlackBerry. Feb. 17, 2009. Retrieved from: http://www.pocketberry.com/2009/02/17/jnetx-call-reminder-for-blackberry/.

AppManiax, Inc. "PhonePlus Callback". http://www.handango.com/catalog/ProductDetails.jsp?productId=254405&platformId=80.

Christoph Hammerschmidt, MELEXIS, The Sky's the Limit, Continental NXP to integrate NFC into cars, Feb. 17, 2011, http://automotive-eetimes.com/en/continental-nxp-to-integrate-nfc-into-cars.html?cmp_id=.

Blackberry, Blackberry Curve Series Blackberry Curve 9300/9330 Smartphones, User Guide Version 6.0, www.blackberry.com/docsismartphones.

SYSTEM AND METHOD FOR DETECTING THE LOCATION OF A COMMUNICATION DEVICE IN A VEHICLE BASED ON CAMERA DETECTION

CROSS-REFERENCE TO RELATED APPLICATIONS

This application claims the benefit of U.S. provisional application Ser. Nos. 61/352,251 filed on Jun. 7, 2010 and 61/361,621 filed on Jul. 6, 2010, which are hereby incorporated by reference in their entirety.

TECHNICAL FIELD

Embodiments disclosed herein generally relate to a system and method for detecting the location of a communication device in a vehicle based on camera detection.

BACKGROUND

It is known to restrict cell phone usage for a driver in a vehicle. An example of such an implementation is disclosed in co-pending International Application No. PCT/US2010/034030 ("the '030 publication") to Miller et al., filed on May 5, 2010. It is also known to detect if a cell phone is in use in a vehicle. U.S. Pat. No. 7,474,264 ("the '264 patent") to Bolduc et al. discloses a system and method that detects the use of radio frequency (RF) transmit devices (e.g., cellular phones) in a vehicle.

The '264 patent further discloses that the system includes a first RF antenna for detecting signal strength of an RF signal transmit device at a first location in a vehicle and a power first detector for generating a first output signal indicative thereof. The system also includes a second antenna for detecting signal strength of the RF signals at a second location in the vehicle and a second power detector for generating a second output signal indicative thereof. The system further includes a signal processor for processing the first and second output signals to determine the presence of an RF transmit device in use in the vehicle and to further determine the location of the RF transmit device to determine if a driver is using the device.

Additional references that may be informative with respect to vehicle cell phone restriction include: U.S. Publication Nos. 2010/0148920 and 2011/0021234.

SUMMARY

A system for detecting a personal communication device (PCD) in a vehicle having driver and passenger zones is provided. The system includes a camera and a controller. The camera is configured to transmit a first signal indicative of a captured image of an object in the driver zone. The controller is configured to receive the first signal and to receive a status signal indicative of the PCD being in a sleep mode or an active mode. The controller is further configured to receive a motion signal indicative of the PCD being in a stationary mode or a motion mode and to detect that the PCD is in the driver zone if the captured image of the object corresponds to the PCD and if the status signal indicates that the PCD is in the wake up mode or the motion signal indicates that the PCD is in the motion mode.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The notion of restricting cell phone usage in a vehicle is known. While it is suggested that vehicles adopt implementations to restrict cell phone usage for drivers while the vehicle is being driven, such implementations may consider ensuring that passengers in the vehicle are free to engage in cell phone activity as desired since these occupants are not responsible for driving the vehicle. These implementations may consider enabling cell phone usage for the driver in moments in which the vehicle is "parked" and/or temporarily in a "stopped" condition. The embodiments as set forth establish driver and passenger zones such that a cell phone detected to be in the driver zone by way of camera may be restricted. In addition, the embodiments may enable a cell phone detected to be in a passenger zone to operate as desired. Moreover, vehicle operating conditions may be monitored so that the driver can utilize his/her cell phone within the driver zone in moments when the vehicle is in park or other temporary stopped condition. Further, occupant detection may be utilized to determine the number of passengers in the vehicle to determine whether to increase the size of the driver zone to prevent the driver from leaning over into a passenger zone to avoid cell phone restriction.

The embodiments set forth herein generally illustrate and describe a plurality of controllers, modules, and/or devices (or electrically based components). All references to the various electrically based components and the functionality provided for each, are not intended to be limited to encompassing only what is illustrated and described herein. While particular labels may be assigned to the various electrically based components disclosed, such labels are not intended to limit the scope of the operation thereof. The electrically based components may be combined with each other and/or separated in any manner based on the particular type of electrical architecture that is desired or intended to be implemented in the vehicle. The electrically based components may be combined with each other and/or separated in any manner based on the particular type of electrical architecture that is desired in the vehicle. It is generally recognized that each electrically based component disclosed herein may include, but not limited to, any number of microprocessors, ICs, discrete analog devices, memory devices (e.g., FLASH, RAM, ROM, EPROM, EEPROM, or other suitable variants thereof), and software which co-act with one another to perform the various functions set forth below.

Figure 1:
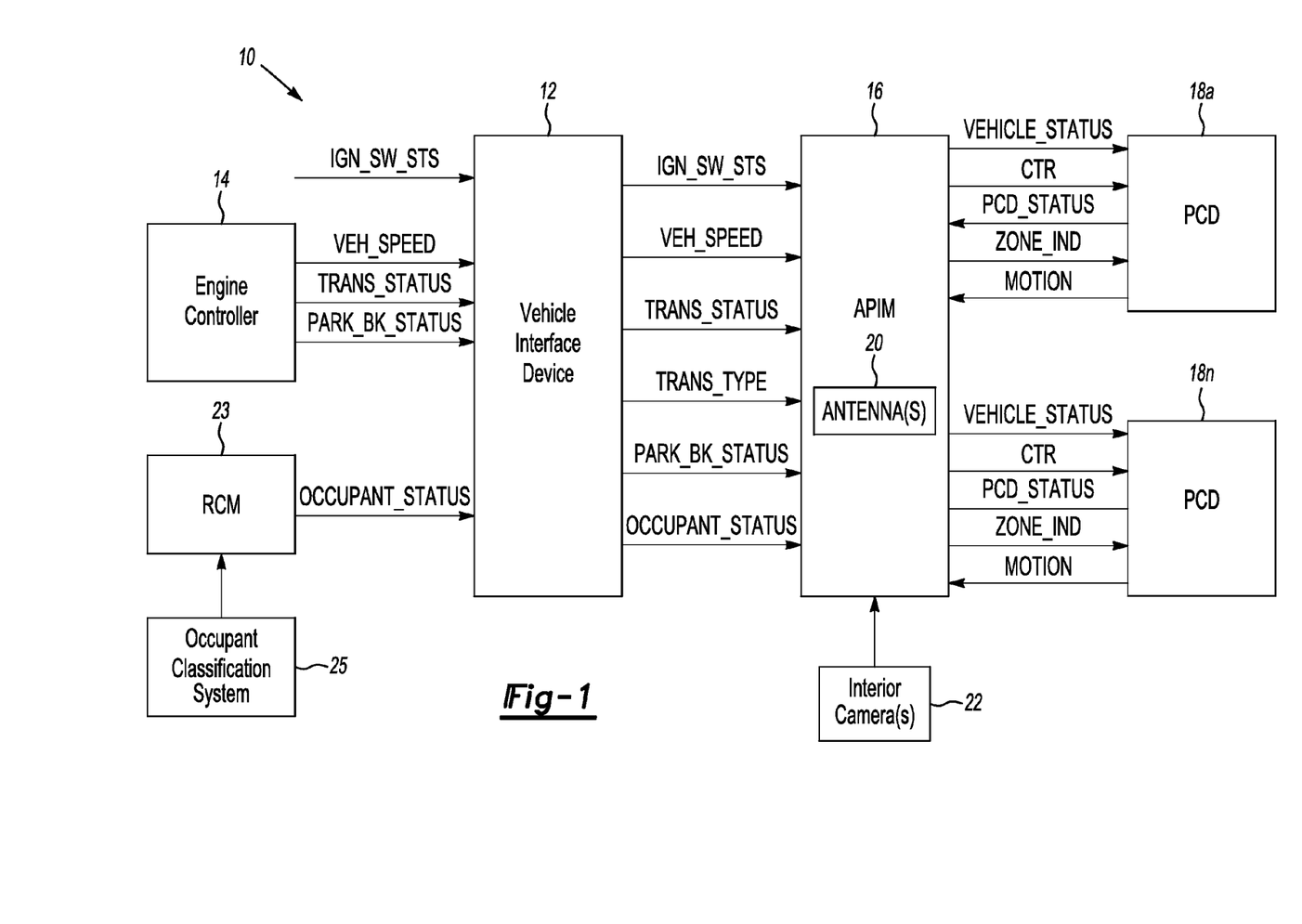
FIG. 1 depicts a system for detecting the location of a personal communication device (PCD) in accordance to one embodiment.

FIG. 1 depicts a system 10 for detecting the location of a personal communication device (PCD) in accordance to one embodiment. The system 10 includes a vehicle interface device 12, an engine controller 14, and an auxiliary protocol interface module (APIM) (or controller) 16. The vehicle interface device 12 may be implemented as user interface, which provides information related to various states of vehicle functionality to the driver. For example, the device 12 may include a display and/or audible mechanism that provides status or warning messages to the driver and/or as a switch device (e.g., touch screen, voice input, or other suitable device) that enables the driver to select/input vehicle functions/features.

The device 12, the engine controller 14, and the controller 16 may transmit signals to and from one another via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys (not shown). The device 12 may receive a signal IGN_SW_STS from a body controller (not shown) to determine the position of the ignition switch. The engine controller 14 transmits a signal VEH_SPEED to device 12. The signal VEH_SPEED corresponds to the speed of the vehicle. The engine controller 14 also transmits a signal TRANS_STATUS and a signal PARK_BK_STATUS to the device 12. The signal TRANS_STATUS corresponds to whether the transmission is in a PARK (P), Reverse (R), Neutral (N), Drive (D), or Low (L) state. The signal PARK_BK_STATUS corresponds to whether a park brake (not shown) is engaged. The signal PARK_BK_STATUS may be of interest in the event the vehicle is equipped with a manual transmission. For example, if the signal PARK_BK_STATUS indicates that the park brake is engaged, such a condition may correspond to the vehicle being in a parked state while the vehicle is equipped with a manual transmission. It may not be possible for a manual transmission to provide transmission status. This aspect will be discussed in more detail below.

The device 12 may transmit the signals IGN_SW_STS, VEH_SPEED, TRANS_STATUS, and PARK_BK_STATUS to the controller 16. The device 12 may also transmit a signal TRANS_TYPE which corresponds to the type of transmission that is equipped in the vehicle. For example, the vehicle may include an automatic transmission or a manual transmission. It is recognized that all of the signals noted above may be transmitted directly to the controller 16 from the engine controller 14.

The controller 16 may be wirelessly coupled to any number of portable communication devices (PCDs) 18a-18n ("18") via a wireless protocol such as but not limited to Bluetooth®. Each PCD 18 may be a cell phone or other suitable alternative. The controller 16 is part of an in-vehicle communication system (and includes at least one transmitter (not shown) and at least one receiver (not shown)) which interfaces with each PCD 18 to enable voice input control to perform a function with the PCD 18 so that the driver does not have to enter data directly into the PCD 18. The controller 16 may allow the user to operate a PCD 18 either in a handheld mode (e.g., manual mode) or in a voice control mode (e.g., w/o touch input control). The controller 16 may interface via switches (not shown) positioned within the vehicle to enable touch selection control to perform a function with the PCD 18 so that the driver does not have to enter data directly into the PCD 18. In one example, the controller 16 may be implemented as part of the SYNC system developed by Ford Motor Company® and Microsoft®. Switches may be positioned on the controller 16, the vehicle's steering wheel (not shown) or on the device 12 to enable touch input.

The controller 16 may include at least one antenna 20 for receiving signals from each PCD 18 located in the vehicle. It is recognized that the antenna 20 may be positioned exterior to the controller 16. The placement of the at least one antenna 20 may vary based on the desired criteria of a particular implementation.

A signal PCD_STATUS may provide information corresponding to (i) a device name for each PCD 18 and (ii) phone status (e.g., whether PCD 18 is active or in a sleep state) for each PCD 18. The device name information is used to notify the controller 16 of the identity of the PCD 18. Each PCD 18 may provide a signal MOTION that is indicative of whether the PCD 18 is moving within the vehicle. For example, each PCD 18 may have a three-axis accelerometer (not shown) positioned therein that provides an output as to whether the PCD 18 is moving. The motion aspect of the PCD 18 will be discussed in more detail in connection with FIG. 3.

In one example, each PCD 18 may be pre-programmed to the controller 16 so that the controller 16 and the PCD 18 can engage in signal transmission between one another. In another example, an open communication dialog may be enabled to allow the controller 16 and the PCD 18 to communicate (e.g., no pre-programming of the PCD to the controller 16 may be required). The signal strength of the Bluetooth based signal PCD_STATUS may be determined by the controller 16. It is recognized that the at least one antenna 20 may be positioned interior or exterior to the controller 16 for receiving the signal PCD_STATUS.

Figure 2:
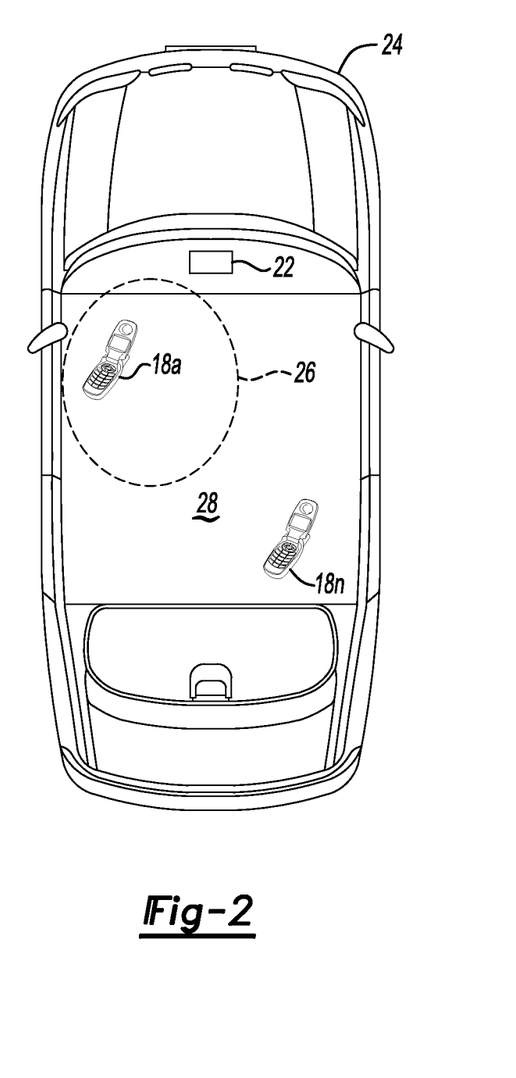
FIG. 2 depicts a vehicle including at least one camera and having a driver zone and a passenger zone in accordance to one embodiment.

The system 10 further includes at least one camera 22. The camera 22 may be positioned underneath a rear view mirror (not shown) or other suitable location. The camera 22 may be oriented such that it faces a driver. FIG. 2 depicts a vehicle 24 including the camera 22 and having a driver zone 26 and a passenger zone 28 in accordance to one embodiment. The driver zone 26 is generally defined as an area in the vehicle 24 where the driver may be situated. The passenger zone 28 is generally defined as an area in the vehicle 24 where one or more passengers may be situated. The camera 22 is generally orientated to capture an image of the driver. The camera 22 may be used to determine whether the driver is using a PCD 18 in the driver zone 26. This will be discussed in more detail below.

Turning back to FIG. 1, a restraint control module (RCM) 23 and an occupant classification system (OCS) 25 is operably coupled to the device 12. The OCS 25 generally includes a single position sensor that is disposed in the front passenger seat of the vehicle 24. The position sensor is configured to transmit a signal OCCUPANT_STATUS to the RCM 112 to indicate whether an occupant is positioned in the front passenger seat of the vehicle 24. The controller 16 may receive the signal OCCUPANT_STATUS from the RCM 23 or the device 12 to determine if an occupant is positioned in the front passenger seat of the vehicle 24. The relevance of whether a front passenger is seated in the vehicle 24 will be discussed in more detail below in connection with operation 60 of method 40.

The controller 16 determines whether the PCD 18 is in the driver zone 26 based on data received from the camera 22 and on additional data received from the PCD 18. The controller 16 transmits a signal ZONE_IND to the PCD 18 that is detected to be in the driver zone 26. The controller 16 associates the device name as received on the signal PCD_STATUS for the PCD 18 found in the driver zone 26 and transmits the signal ZONE_IND to the corresponding PCD 18 to notify the PCD 18 that it is in the driver zone 26. The controller 16 also transmits a signal VEHICLE_STATUS to the PCD 18 that is detected to be in the driver zone 26. The signal VEHICLE_STATUS corresponds to whether the driver is "active" (e.g., vehicle 24 is moving where vehicle speed is above predetermined threshold (or vehicle 24 is not in PARK)) or "inactive" (e.g., vehicle speed is below a predetermined threshold or vehicle 24 is in PARK). The controller 16 monitors the signals IGN_SW_STS, VEH_SPEED, TRANS_SPEED, TRANS_TYPE and/or PARK_BK_STATUS to determine whether the vehicle 24 (or driver) is active or inactive.

In the event the signal ZONE_IND indicates that the PCD 18 is in the driver zone 26 and the VEHICLE_STATUS indicates that the driver is active, then the PCD 18 may disable its operation or only allow itself to operate via voice control (or hands free) in conjunction with the controller 16. The controller 16 also transmits a signal CTR to each PCD 18 to control each PCD 18 to set motion status to stationary. The controller 16 uses the signal CTR as a means to control each PCD 18 to indicate it is in a stationary mode. This aspect will be discussed in more detail in connection with FIG. 3 for purposes of detecting which zone the PCD 18 is located in.

Figure 3:
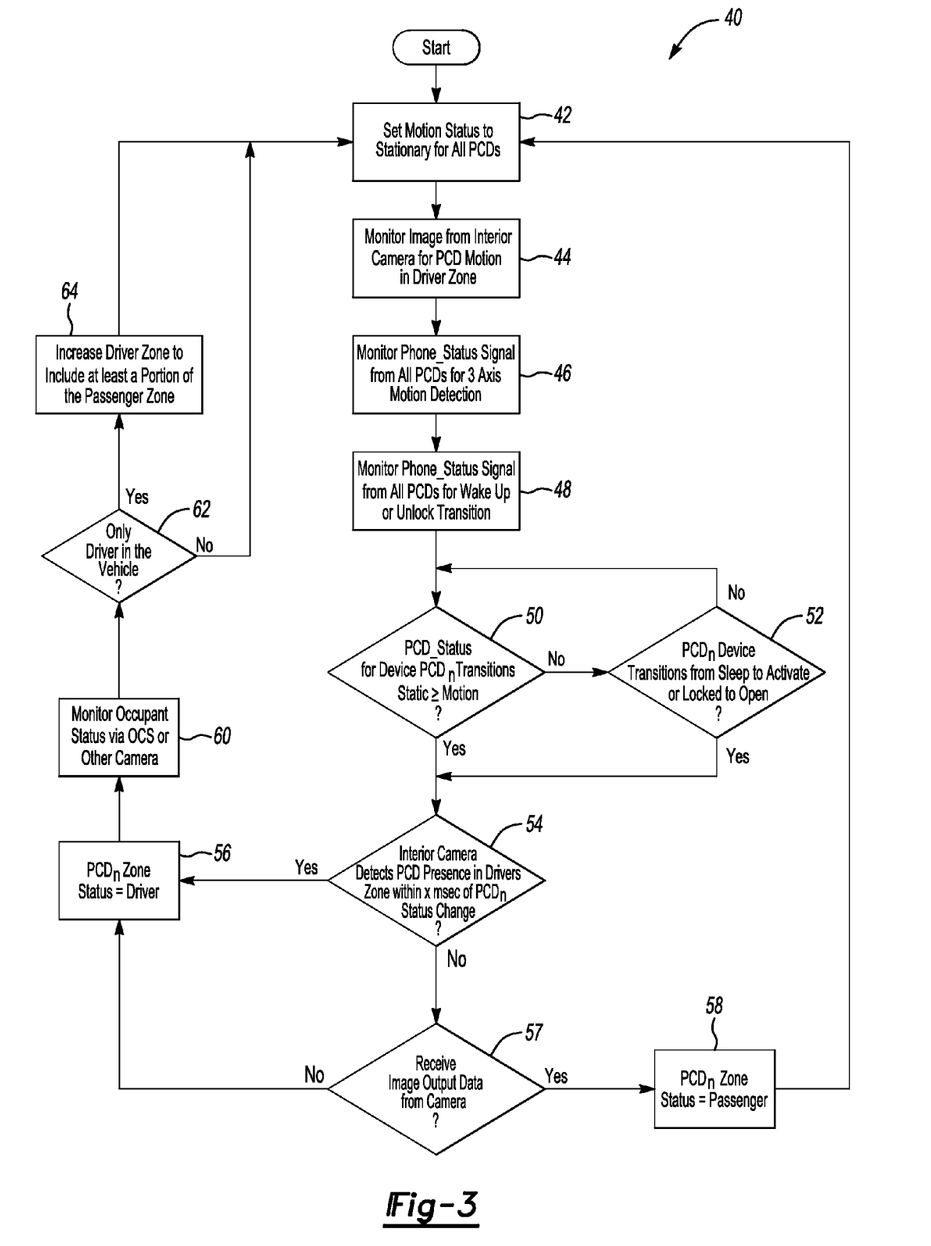
FIG. 3 depicts a method for determining whether the PCD is located in a driver zone or a passenger zone in accordance to one embodiment.

FIG. 3 depicts a method 40 for determining whether the PCD 18 is located in the driver zone 26 or a passenger zone 28 in accordance to one embodiment. The particular order of the operations in the method 40 when executed can be in any order and are not to be limited to only being performed sequentially. The order of the operations may be modified or varied based on the desired criteria of a particular implementation.

In operation 42, the controller 16 transmits the signal CTR to each PCD 18 detected to be in the vehicle 24. The controller 16 transmits the signal CTR to control each PCD 18 to output the signal MOTION to indicate that the PCD 18 is in a stationary mode. Each PCD 18 may indicate that it is stationary for a predetermined amount of time even if such PCD 18 is actually moving. The predetermined amount of time may correspond to 30 seconds or other suitable value. This condition may be used as a means to synchronize or set all of the PCDs 18 in the vehicle 24 to an initial known condition.

In another embodiment, the controller 16 may change the motion mode as known for each PCD 18 detected to be in the vehicle to a stationary mode for a small period of time. In this case, it may not be necessary to transmit the signal CTR to each PCD 18 to put into an initial known condition. After a predetermined time, the controller 16 may receive and monitor the signal MOTION and change the mode from a stationary mode to a motion mode in the event the PCD 18 indicates that it is still motion (or is in motion). Either embodiment may effectively deal with the situation in which the passenger may use the PCD 18 (and has the PCD 18 in motion) and then subsequently pass the PCD 18 to the driver in the driver zone 26. The method 40 may be situated to effectively locate that the PCD 18 is in the driver zone 26 after the PCD18 was initially in motion (or in use) in the passenger zone 28.

In operation 44, the controller 16 monitors data received from the camera 22. As noted above, the camera 22 may be orientated or positioned on the driver in the driver zone 26 and transmit data regarding the same to the controller 16. For example, the camera 22 may capture an image of the driver while in the driver zone 26 and process data to detect any gesture or motion that indicates PCD usage (e.g., manual entry on the PCD 18, the viewing of a screen/display, or holding of the PCD 18 to an ear of the driver).

In operation 46, the controller 16 monitors the signal MOTION from each PCD 18 in the vehicle 24 At this point, it is presumed that the predetermined amount of time has expired as noted above in connection with operation 42 and that each PCD 18 transmits data as to whether it is actually moving or stationary on the signal MOTION back to the controller 16.

In operation 48, the controller 16 monitors the signal PCD_STATUS from each PCD 18 to determine whether one or more of the PCDs 18 have exhibited a wake up condition.

In operation 50, the controller 16 determines whether the PCD 18 transitions to a moving mode (e.g., the PCD 18 is physically being moved) after being in a stationary state. If the above condition is true, then the method 40 moves to operation 54. If the above condition is not true, then the method 40 moves to operation 52.

In operation 52, the controller 16 determines whether each PCD 18 transitions from a "sleep" mode to a "wake up" mode. For example, the user may flip open the PCD 18 or toggle any button or switch on the PCD 18 to wake up the PCD 18. If the above condition is true, then the method 40 moves to operation 54. If the above condition is not true, then the method 40 moves to operation 50.

In operation 54, the controller 16 determines whether the PCD 18 is detected to be in the driver zone 26 (or proximate to the driver) within a predetermined time frame of the PCD 18 exhibiting a status change. The status change may be defined as the PCD 18 transitioning from a static condition to a moving condition or to the PCD 18 transitioning from a sleep mode to a wake mode. For example, the camera 22 may transmit data that indicates that the PCD 18 exhibits a status change (i) from a stationary mode to a wake up mode when such a PCD 18 captured in the driver zone 26 (e.g., PCD 18 is in the driver's hand or is positioned proximate to the driver's ear) or (ii) when the PCD 18 transitions from a sleep mode to an active mode when the PCD 18 is captured in the driver zone 26. The predetermined time frame may correspond to a value that is less than 500 msec or other suitable value. The particular time frame selected may vary based on the desired criteria of a given implementation.

In the event the controller 16 determines that the PCD 18 is detected to be in the driver zone 26 within the predetermined time frame of the PCD 18 exhibiting a status change, then the method 40 moves to operation 56. If the above condition is not true, then the method 40 moves to operation 57. It is recognized that in the event, multiple PCDs 18 exhibit a status change (e.g., transition from a sleep to an active mode or transition from a static mode to a motion mode at roughly the same time (e.g., within 500 msec seconds or other suitable value) of one another and the camera 22 detects a PCD 18 within the driver zone 26 and within the predetermined time frame, then the controller 16 may consider all of the multiple PCDs 18 as being in the driver zone 26. This may be considered or defined as a fail-safe strategy.

In operation 56, the controller 16 determines that the PCD 18 is positioned in the driver zone 26. The controller 16 transmits the signal ZONE_ID to the PCD 18 detected to be in the driver zone 26 to indicate that the PCD 18 is in the driver zone 26.

In operation 57, the controller 16 determines whether the image data received from the camera 22 corresponds to an actual image that is legible or discernable. For example, the driver may attempt to cover or obstruct lens of the camera 22 in an attempt to avoid being captured with the PCD 18. In the event the controller 16 may not ascertain the image transmitted from the camera 22 as a valid image of if the image appears to be too dark and the image cannot be ascertained, then the method 40 moves to operation 56 such that the PCD 18 that is detected to transition from a static mode to the wake-up mode is defined as being in the driver zone 26. If an image can be obtained that is legible by the controller 16 that does not appear to be obstructed, then the method 40 moves to operation 58.

In operation 58, the controller 16 determines that the PCD 18 is in the passenger zone. In short, if the controller 16 determines that the an PCD 16 has exhibited a status change and the camera 22 has not detected the presence of the PCD 16 in the driver zone 26, then the controller 16 infers (and/or determines) that such a PCD 18 is located in the passenger zone 28. It is recognized that one camera 22 may be positioned proximate to, or configured to capture images in the driver zone 26 and that one or more additional cameras 22 may be positioned in the passenger zone 26 to confirm that the PCD 18 is in the passenger zone 28.

In operation 60, the controller 16 monitors whether another occupant is seated in the passenger zone 28 (or in the front passenger seat of the vehicle 24). For example, the controller 16 may receive the signal OCCUPANT_STATUS to make such a determination. In another example, a second camera 22 may be positioned to capture an image(s) of the occupant in the passenger zone 28 and transmit data to the controller 16 to indicate whether another occupant is seated in the front passenger seat.

In operation 62, the controller 16 determines whether another occupant is seated in the front passenger seat of the vehicle 24. If the controller 16 determines that another occupant is not seated in the front passenger seat of the vehicle 24 (or that only the driver is in the vehicle 24), then the method 40 moves to operation 64. If the controller 16 determines that another occupant is seated in the front passenger seat, then the method 40 moves to operation 42.

Figures 4A, 4B:
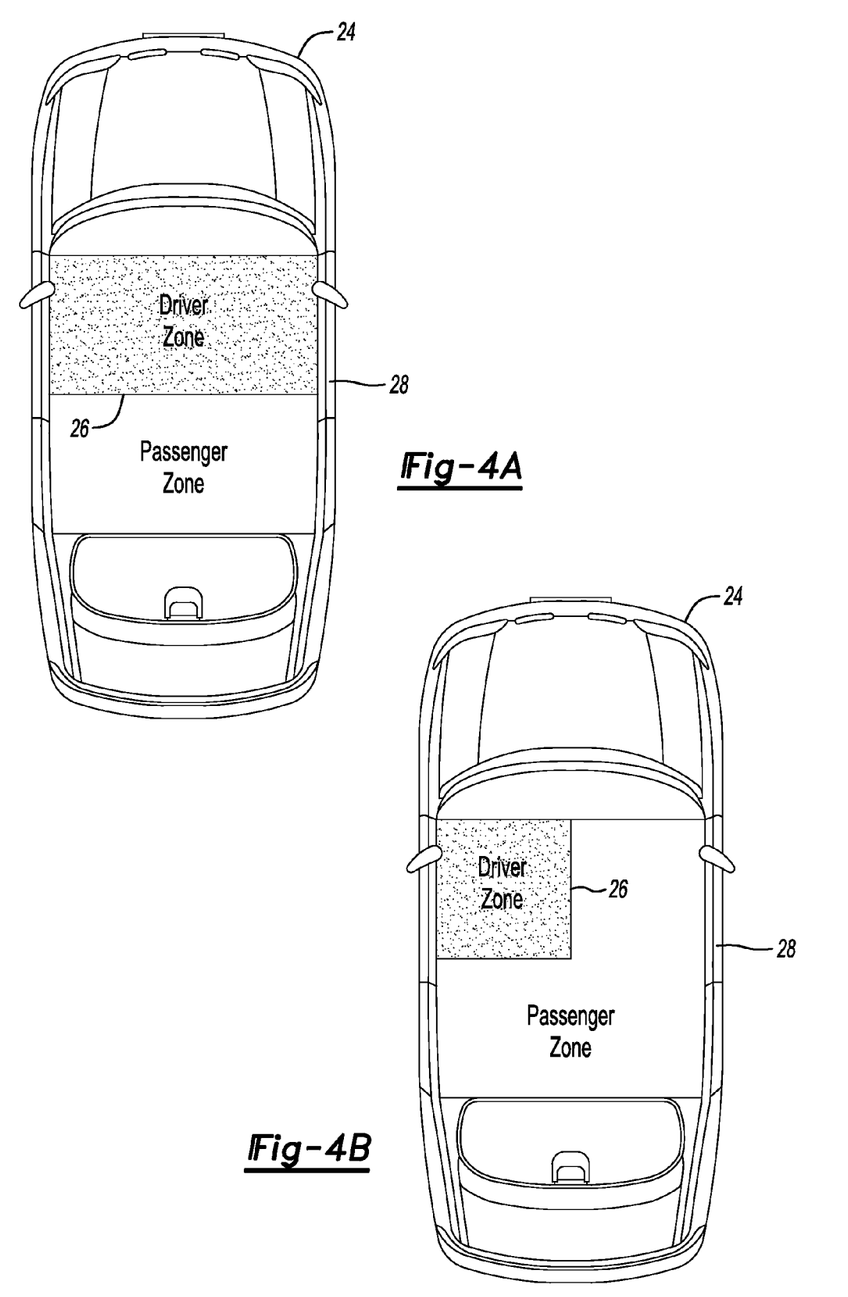
FIG. 4A-4B depict various driver zones and passenger zones as used in connection with an occupant classification system in accordance to one embodiment.

In operation 64, the controller 16 may increase the driver zone 26 such that it includes at least the front passenger area of the passenger zone 28. This configuration is generally shown in FIG. 4A and may be defined as a modified driver zone. By extending the driver zone 26 to include at least a portion of the passenger zone 26, the controller 16 cannot be tricked into determining that the PCD 18 that was originally detected in the driver zone 26 has moved into the passenger zone 28 in attempt to avoid any restrictions in the event one or more of the conditions as described in connection with method 80 warrant PCD restriction. FIG. 4B depicts the driver zone 26 being in a normal state in the event the driver is in the vehicle 24 and a front passenger is determined to be in the vehicle 24.

Figure 5:
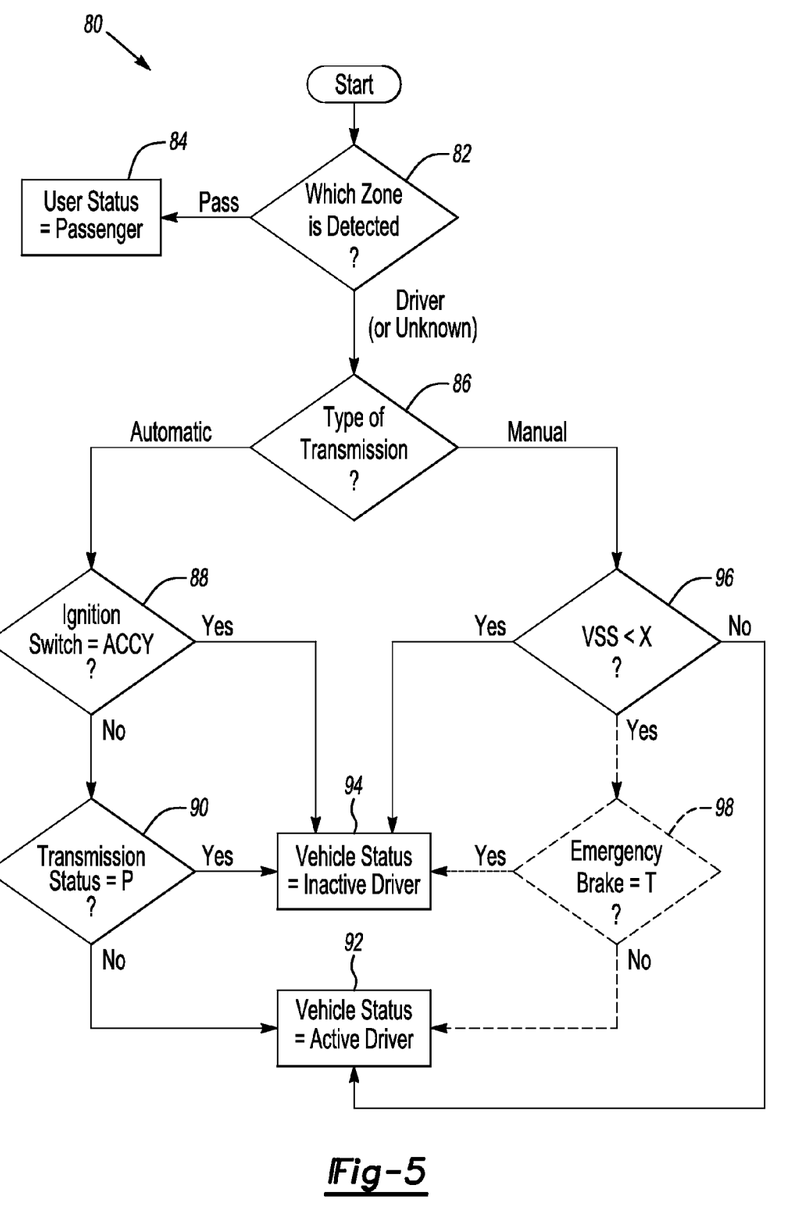
FIG. 5 depicts a method for determining whether the driver is in one of an active state or an inactive state so that the PCD is capable of being controlled based on the state in accordance to one embodiment.

FIG. 5 depicts a method 80 for determining whether the driver is in one of an active state or an inactive state so that the PCD 18 is capable of being controlled based on the state in accordance to one embodiment. The particular order of the operations in the method 80 when executed can be in any order and are not to be limited to only being performed sequentially. The order of the operations may be modified or varied based on the desired criteria of a particular implementation.

In operation 82, the controller 16 determines which zone each PCD 18 is in (e.g., the method 40 as noted above). Presumably, if there are more than two PCDs 18 in the vehicle 24, one will be in the passenger zone 28 and the other in the driver zone 26. For the PCD(s) 18 detected to be in the passenger zone 28, the method 80 moves to operation 84. For the PCD 18 detected to be in the driver zone 26, the method 80 moves to operation 86.

In operation 84, the controller 16 determines that the PCD 18 is in the passenger zone 28 (see operation 58 in connection with FIG. 3). At this point, the PCD(s) 18 will not impose restrictions since it is detected to be in the passenger zone 28.

In operation 86, the controller 16 determines the transmission type for the vehicle 24 based on the signal TRANS_TYPE. As noted above, the signal TRANS_TYPE indicates whether the vehicle 24 includes an automatic or manual transmission. If the vehicle 24 includes an automatic transmission, then the method 80 moves to operation 88. If the vehicle 24 includes a manual transmission, then the method 80 moves to operation 96.

In operation 88, the controller 16 determines whether the key in ignition is in the Accessory ("ACCY") state by monitoring the signal IGN_SW_STS. If the key in ignition is not in the ACCY state, then the method 80 moves to operation 90. If so, then the method 80 moves to operation 94. If the vehicle 24 is in the ACCY state, then it is presumed that the vehicle 24 is in PARK and restrictions on the PCD 18 (even if in the driver zone 26) is not necessary.

In operation 90, the controller 16 determines the transmission status by monitoring the signal TRANS_STATUS. If the signal indicates that that the vehicle 24 is in any state other than PARK, then the method 90 moves to operation 92. If the signal indicates that the vehicle 24 is in PARK, then the method 90 moves to operation 94. It is recognized that vehicle speed may be used in place of transmission status. For example, if the vehicle speed is determined to be greater than a predetermined vehicle speed, then PCD 18 restriction may be imposed.

In operation 92, the controller 16 determines that the driver is an active driver (e.g., the vehicle is in a non-stopped state, or may be moving above a predetermined vehicle speed). The active state generally corresponds to a state in which PCD 18 operation may be restricted completely or partially (such as in a hands free mode or voice recognition is allowed). The controller 16 transmits the signal VEHICLE_STATUS indicating that the vehicle 24 is in a non-stopped state (e.g., the driver (or vehicle) is active) to the PCD 18 that is detected to be in the driver zone 26. The PCD 18 may then restrict its operation by disabling operation for the driver when the vehicle is in the non-stopped state or may enable voice control operation such that the driver can only use voice input via the controller 16 (e.g., force on hands free operation) to operate and engage in conversation with another party. In the event operation 64 of method 40 (see FIG. 3) is found to be true, then the controller 16 transmits the signal VEHICLE_STATUS indicating that the vehicle is in a non-stopped state to the PCD 18 that is found in the modified driver zone (e.g., the driver zone 26 in addition to the at least portion of the passenger zone 28).

In operation 94, the controller 16 determines that the driver is inactive (e.g., the vehicle is in a stopped state). That is, the driver may be parked or stopped at a light or other location. The inactive state generally corresponds to a state in which full PCD 18 operation may be allowed. In this condition, the controller 16 transmits the signal VEHICLE_STATUS indicating that the vehicle 24 is in a stopped state (e.g., the driver (or vehicle) is inactive) to the PCD 18 that is detected to be in the driver zone 26. The PCD 18 may then allow full operation. Meaning, the driver may be able to directly physically control the PCD 18 via touch entry or may continue to use voice control operation (or hands free operation).

In operation 96, the controller 16 determines whether the vehicle speed as indicated on the signal VEH_SPEED is below a predetermined vehicle speed. If the vehicle speed is below the predetermined vehicle speed, then the method 80 moves to operation 94 and the driver is classified as an inactive driver and full PCD 18 operation may be maintained by the driver if inactive. If the vehicle speed is above the predetermined vehicle speed, then the method 80 may optionally move to operation 92.

In another example, in operation 98, park brake status may be used in place of the vehicle speed for determining whether the driver is active or inactive. For example, the controller 16 determines whether the park brake is engaged by monitoring the signal PARK_BK_STATUS. In this condition, the vehicle 24 is equipped with a manual transmission as noted in connection with operation 86. The controller 16 may monitor park brake status as a mechanism to determine if the vehicle 24 is in a park or non-park state since the controller 16 may not receive an indication of PRNDL status (or transmission status) from an automatic transmission because the vehicle is not equipped with an automatic transmission. If the park brake is engaged, then the method 80 moves to operation 94 where the driver is an inactive driver and full PCD 18 operation may be allowed for the driver. If not, then the method 80 may move directly to operation 92 where the driver is classified as an active driver and the PCD 18 restrictions are imposed.

It is recognized for manual transmission that full PCD 19 operation may be allowed if the vehicle is in PARK or when the vehicle is detected to be less than a predetermined speed (e.g., vehicle is stopped at a stop light or for some other reason while not in PARK). In another embodiment, operations 96 and 98 may be combined such that both vehicle speed and park brake status are monitored together to determine if the driver is active or inactive. This may improve resolution in determining whether the driver is active or inactive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for detecting a personal communication device (PCD) in a vehicle having a driver zone and a passenger zone, the system comprising:
a camera configured to transmit a first signal indicative of a captured image of an object in the driver zone;
a controller configured to:
receive the first signal;
receive a status signal indicative of the PCD being in one of a sleep mode and a wake up mode;
receive a motion signal indicative of the PCD being in one of a stationary mode and a motion mode; and
detect that the PCD is in the driver zone in response to the captured image of the object corresponding to the PCD and one of the status signal indicating that the PCD is in the wake up mode and the motion signal indicating that the PCD is in the motion mode.

2. The system of claim 1 wherein the controller is further configured to detect that the PCD is in the driver zone in response to receiving the first signal indicating that the captured image of the object corresponds to the PCD within a predetermined time frame of also receiving the one of the status signal indicating that the PCD is in the wake up mode and the motion signal indicating that the PCD is in motion mode.

3. The system of claim 1 wherein the controller is further configured to transmit a zone indicator signal to the PCD to indicate that the PCD is in the driver zone in response to detecting that the PCD is in the driver zone.

4. The system of claim 1 wherein the controller is further configured to receive a transmission status signal indicative of the vehicle being in one of a parked state and a non-parked state.

5. The system of claim 4 wherein the controller is further configured to transmit a vehicle status signal to the PCD such that the PCD restricts usage thereof in the driver zone in response to the transmission status signal indicating that the vehicle is in a non-parked state and the PCD is detected to be in the driver zone based on the captured image of the object corresponding to the PCD.

6. The system of claim 1 wherein the controller is further configured to receive a vehicle speed signal indicative of a speed of the vehicle.

7. The system of claim 6 wherein the controller is further configured to transmit a vehicle status signal to the PCD such that the PCD restricts usage thereof in the driver zone in response to the vehicle speed signal indicating that the speed is greater than a predetermined vehicle speed.

8. The system of claim 1 wherein the controller is further configured to receive a park brake signal indicative of a park brake being engaged.

9. The system of claim 8 wherein the controller is configured to transmit a vehicle status signal to the PCD such that the PCD restricts usage thereof in the driver zone in response to the park brake signal indicating that the park brake is engaged and the PCD is detected to be in the driver zone.

10. The system of claim 1 wherein the controller is further configured to receive an occupant status signal indicative of a passenger being positioned in a front passenger area of the passenger zone.

11. The system of claim 10 wherein the controller is further configured to increase the driver zone to extend into at least a portion of the passenger zone in response to the occupant status signal indicating that the passenger is not positioned in the front passenger area, the controller being further configured to transmit a vehicle status signal to the PCD to restrict usage thereof in response to the PCD being detected in one of the driver zone and in the at least the portion of the passenger zone.

12. The system of claim 1 wherein the controller is further configured to detect that the PCD is in the driver zone in response to determining that the captured image of the object is not recognizable and in response to determining that the one of the status signal indicates that the PCD is in the wake up mode and the motion signal indicates that the PCD is in the motion mode.

13. A method for detecting a personal communication device (PCD) in a vehicle having a driver zone and a passenger zone, the method comprising:
receiving, at a controller, a first signal indicative of a captured image of an object in the driver zone;
receiving, at the controller, a status signal indicative of the PCD being in one of a sleep mode and a wake up mode;
receiving a motion signal indicative of the PCD being in one of a stationary mode and a motion mode;
detecting that the PCD is in the driver zone in response to the captured image of the object corresponding to the PCD and one of the status signal indicating that the PCD is in the wake up mode and the motion signal indicating that the PCD is in the motion mode.

14. The method of claim 13 wherein detecting that the PCD is in the driver zone further comprises detecting that the PCD is in the driver zone in response to receiving the first signal indicating that the captured image of the object corresponds to the PCD within a predetermined time frame of also receiving the one of the status signal indicating that the PCD is in the wake up mode and the motion signal indicating that the PCD is in motion mode.

15. The method of claim 13 further comprising transmitting a zone indicator signal to the PCD to indicate that the PCD is in the driver zone in response to detecting that the PCD is in the driver zone.

16. The method of claim 13 further comprising receiving a transmission status signal indicative of the vehicle being in one of a parked state and a non-parked state.

17. The method of claim 16 further comprising transmitting a vehicle status signal to the PCD to restrict usage thereof in the driver zone in response to the transmission status signal indicating that the vehicle is in a non-parked state and the PCD is detected to be in the driver zone.

18. The method of claim 13 further comprising receiving a vehicle speed signal indicative of a speed of the vehicle.

19. The method of claim 18 further comprising transmitting a vehicle status signal to the PCD to restrict usage thereof in the driver zone in response to the vehicle speed signal indicating that the speed is greater than a predetermined vehicle speed.

20. An apparatus comprising:
a controller configured to:
receive a first signal from a camera indicative of an image of a personal communication device (PCD) in a driver zone in a vehicle;
receive a second signal indicative of the PCD being one of active and in motion; and
detect that the PCD is in the driver zone in response to receiving the first signal within a predetermined time frame of receiving the second signal.

* * * * *